United States Patent
Saluja et al.

(10) Patent No.: US 10,409,971 B2
(45) Date of Patent: Sep. 10, 2019

(54) SYSTEM AND METHOD FOR SECRETIVE STORAGE OF APPLICATIONS IN PORTABLE COMPUTING DEVICE

(71) Applicant: OSLABS PTE. LTD., Singapore (SG)

(72) Inventors: Preeti Saluja, Bangalore (IN); Akash Dongre, Nagpur (IN); Sudhir Bangarambandi, Mumbai (IN)

(73) Assignee: OSLABS PTE. LTD., Singapore (SG)

( * ) Notice: Subject to any disclaimer, the term of this patent is extended or adjusted under 35 U.S.C. 154(b) by 446 days.

(21) Appl. No.: 15/179,106

(22) Filed: Jun. 10, 2016

(65) Prior Publication Data

US 2017/0004297 A1 Jan. 5, 2017

(51) Int. Cl.
| | |
|---|---|
| G06F 21/32 | (2013.01) |
| G06F 9/44 | (2018.01) |
| G06F 7/04 | (2006.01) |
| G06F 12/00 | (2006.01) |
| G06F 21/36 | (2013.01) |
| G06F 21/56 | (2013.01) |

(52) U.S. Cl.
CPC ............. *G06F 21/32* (2013.01); *G06F 21/36* (2013.01); *G06F 21/566* (2013.01); *G06F 2221/034* (2013.01); *G06F 2221/2115* (2013.01)

(58) Field of Classification Search
USPC .......................................................... 726/19
See application file for complete search history.

(56) References Cited

U.S. PATENT DOCUMENTS

| | | | | |
|---|---|---|---|---|
| 2006/0129848 A1* | 6/2006 | Paksoy | ................... | G06F 21/78 713/193 |
| 2012/0246079 A1* | 9/2012 | Wilson | ................ | H04L 63/0807 705/67 |
| 2015/0264169 A1* | 9/2015 | Yim | .................. | H04M 1/72563 455/411 |

* cited by examiner

*Primary Examiner* — Brandon S Hoffman
*Assistant Examiner* — Samuel Ambaye
(74) *Attorney, Agent, or Firm* — Barry Choobin; Patent 360 LLC

(57) ABSTRACT

The embodiments herein provide a system and method for an authentication-driven secret installation and access to applications and data on handheld computing devices. The secret storage is installed and accessed by a directly installed application or a host application on the device. The system comprises an authentication module for authenticating a user to access a data stored in the secret storage area, and a security module for detecting an intrusion of user's privacy during an accessing of the secret storage area. The authentication module automatically shuts down the application when a privacy intrusion is detected continuously for a preset period of time. A secret storage application is run to create a clone of one or more applications installed outside the secret storage area while the created clone of the one or more applications are stored in the secret storage area.

8 Claims, 2 Drawing Sheets

SYSTEM AND METHOD FOR SECRETIVE STORAGE OF APPLICATIONS IN PORTABLE COMPUTING DEVICE

CROSS-REFERENCE TO RELATED APPLICATION

This application claims the priority of the Indian Provisional Patent Application with Ser. No. 2349/MUM/2015 filed on Jun. 11, 2105 with the title "SYSTEM AND METHOD FOR PRIVATE STORAGE AND EXECUTION OF APPLICATIONS IN A COMPUTING DEVICE", and the contents of which is incorporated in entirety as reference herein.

BACKGROUND

Technical Field

The embodiments herein are generally related to data storage systems in handheld computing devices. The embodiments herein are particularly related to a system and method for creation of secret and secretive location for storing and installing applications on the handheld computing devices. The embodiments herein are more particularly related to a system and method for an authentication-driven secretive installation and access of data and applications on the handheld computing devices.

Description of the Related Art

In domestic use, the handheld computing devices are used to replace the conventional desktop computers as the means to access internet. In many instances, a single handheld computing device is used as a shared device for a whole family to access the internet. It is vital to ensure that privacy of every user is protected.

The currently available methods of secret data storage are based on specific storage locations in the computing, device. A secret access to correspondences such as emails or text messages is available in certain specific applications, but there are no currently available methods for secret and secure installation and execution of applications on handheld computing devices.

Hence, there is a need for a system for enabling authentication-driven secretive installation and access of applications and data on handheld mobile computing devices. Further there is a need for a system and method for creation of storage location for storing applications in a handheld computing device. Yet there is a need for a handheld computing device provided with secret storage area for storing and retrieving application.

The abovementioned shortcomings, disadvantages and problems are addressed herein and which will be understood by reading and studying the following specification.

OBJECT OF THE EMBODIMENTS HEREIN

The primary object of the embodiments herein is to provide a system and method for secret and secretive installation of applications on the handheld computing devices.

Another object of the embodiments herein is to provide a system and method for authentication-driven secret installation and access to applications and data on the handheld computing devices.

Yet another object of the embodiments herein is to provide a system and method to enable secret access and installation of applications on handheld computing devices and provide authentication for access and installation of applications through a plurality of authentication process in the handheld computing device.

Yet another object of the embodiments herein is to provide a system and method to enable installation and access of multiple applications on an authentication-driven secret storage location in a handheld computing device.

Yet another object of the embodiments herein is to provide a system and method to enable access to the pre-installed applications by creating clones of pre-installed applications in the handheld computing device through an authentication-driven secret application.

Yet another object of the embodiments herein is to provide a system and method to enable a real-time cloning of applications that are pre-installed in handheld computing device.

Yet another object of the embodiments herein is to provide a system and method to alert the user of a handheld computing device when the privacy of the user is compromised.

Yet another object of the embodiments herein is to provide a system and method to automatically shut down a plurality of applications on a handheld computing device when a privacy invasion is detected.

Yet another object of the embodiments herein is to provide a system and method to enable a plurality of secret and secretive locations in a single handheld computing device.

Yet another object of the embodiments herein is to provide a system and method to enable access of a secret and secretive location on a handheld computing device through an application that is pre-installed in the handheld computing device.

Yet another object of the embodiments herein is to provide a system and method for creation of storage location for storing applications in a handheld computing device.

Yet another object of the embodiments herein is to develop a handheld computing device provided with secret storage area for storing and retrieving application.

These and other objects and advantages of the embodiments herein will become readily apparent from the following summary and the detailed description taken in conjunction with the accompanying drawings.

SUMMARY

The following details present a simplified summary of the embodiments herein to provide a basic understanding of the several aspects of the embodiments herein. This summary is not an extensive overview of the embodiments herein. It is not intended to identify key/critical elements of the embodiments herein or to delineate the scope of the embodiments herein. Its sole purpose is to present the concepts of the embodiments herein in a simplified form as a prelude to the more detailed description that is presented later.

The other objects arid advantages of the embodiments herein will become readily apparent from the following description taken in conjunction with the accompanying draw The various embodiments herein provide a system and method for secret and secretive installation of applications on the handheld computing devices. The embodiments herein provide an authentication-driven secret installation and access to the applications and data on the handheld computing devices. The installation and access of the secret storage is enabled either by direct installation on the computing device or through a host application on the computing device.

According to an embodiment herein, a secret digital data storage system for secretive installation of applications in a secretive location on a handheld computing device is provided. The system comprises a hardware processor, a memory module, an external memory module, a secret storage application stored on the memory module or the external memory module, an authentication module and a security module. The memory module comprises a secret storage area. The external memory module comprises a secret storage area. A secret storage application is run on the hardware processor and configured to store a data in the secret storage area in the memory module or in the secret storage area in the external memory module. The authentication module is run on the hardware processor and configured to authenticate a user to access a data stored in the secret storage at The security module is run on the hardware processor and configured to continuously detect an intrusion of a user's privacy when the user accesses the secret storage area. The security module is run on the hardware processor and configured to shut down the secret storage application when a privacy detection is detected continuously for a preset period of time. The secret storage application is run on the hardware processor and configured to create a clone of one or more applications installed outside the secret storage area in the handheld computing device. The created clones of the plurality of applications are stored in the secret storage area.

According to an embodiment herein, the authentication module is run on the processor and configured to authenticate the user through a plurality of methods. The plurality of methods includes a bio-metric authentication process, retina authentication process, a pattern authentication process, voice authentication process, password authentication process and facial image authentication process.

According to an embodiment herein, the clones of the applications are installed in the secret storage area to enable a user to secretively access applications installed outside the secret storage area in the handheld computing device in an incognito mode.

According to an embodiment herein, the security module is run on the processor and configured to detect an intrusion of a user's privacy through an analysis of an application usage pattern and a history of usage pattern of the user.

According to an embodiment herein, the security module is run on the processor and configured to suspend an access to the secret storage area, when the intrusion of the user's privacy is detected. The security module is run on the processor and configured to communicate a unique identification code to the user through an email message, SMS message and call to mobile phone number to resume an access to the secret storage area. The user is prompted to provide the unique identification code on the handheld mobile computing device to resume an access to the secret storage area.

According to an embodiment herein, a computer implemented method comprising instructions stored on a non-transitory computer readable storage medium and executed on a hand held computing device comprising a hardware processor and memory for accessing a secret storage area provided in a device memory or in an external storage module connected to the hand held computing device, is provided. The method comprises the steps of starting the handheld computing device by powering on the handheld computing device. The handheld computing device is accessed by unlocking the handheld computing device. A secret storage area application for accessing the secret storage area is accessed. The secret storage area is accessed for installing new applications or for accessing a plurality of pre-installed applications and a plurality of stored files. An authentication detail is provided for accessing the secret storage area. An authentication process is performed through an authentication module. The user is allowed to access the secret storage area for accessing an application or data stored in the secret storage area, when the user is successfully authenticated. The secret storage area application is shut down to prevent an access to the user to the secret storage area, when the user is not successfully authenticated. A breach of privacy of the user in accessing the secret storage area is checked continuously with a security module. The security module is run on the hardware processor and configured to continuously detect an intrusion of a user's privacy when the user accesses the secret storage area. The security module is run on the hardware processor and configured to shut down the secret storage: application when a privacy detection is detected continuously for a preset period of time. An access to the secret storage area is terminated, when an operation of the secret storage application is stopped by the user through the hand held computing device or when a preset condition for closing the access to secret storage area is satisfied.

According to an embodiment herein, the step of performing the authentication process comprises authenticating the user through a plurality of methods with the authentication module. The plurality of methods includes a bio-metric authentication process, a retina authentication process, a pattern authentication process, voice authentication process, a password authentication process and a facial image authentication process.

According, to an embodiment herein, the step of checking for a breach of privacy of the user in accessing the secret storage area continuously with a security module comprises detecting an intrusion of a user's privacy through an analysis of an application usage pattern and a history of usage pattern of the user.

According to an embodiment herein, the method further comprises suspending an access to the secret storage area through the security module, when the intrusion of the user's privacy is detected. The security module is inn on the processor and configured to communicate a unique identification code to the user through an email message, SMS message and call to mobile phone number to resume an access to the secret storage area. The user is prompted to provide the unique identification code on the handheld mobile computing device to resume an access to the secret storage area.

According to an embodiment herein, a method further comprises creating a done of one or more applications installed outside the secret storage area in the handheld computing device. The created dories of the plurality of applications are stored in the secret storage area The clones of the applications are installed in the secret storage area to enable a user to secretively access applications installed outside the secret storage area in the handheld computing device in an incognito mode.

According to an embodiment herein, a system and method is provided for a secret access and installation of applications on the handheld computing devices. An authentication for access and installation of applications is enabled through a plurality of ways such as text, audio, video, images based recognition, location etc., in the handheld computing device. A secret storage is enabled with options for secret secretive installation and access to a plurality of applications in a handheld computing device.

According to an embodiment herein, a method for enabling access to pre-installed applications in a handheld computing device through secret storage location, is provided. Clones of applications which are pre-installed on handheld computing device are created in the secret storage to enable an authentication-driven secret and secretive application.

According to an embodiment herein a method is provided to detect privacy intrusion during access of secret storage. When the privacy of a user using secret and secretive usage is compromised or breached, the secret storage application detects the privacy breach and automatically shuts down the secret storage application through a plurality of sensors in the handheld computing device such as image sensors, video sensors, proximity sensors, location sensors etc. Depending on the level of privacy breach, the application is configured to shut down the handheld computing device.

According to an embodiment herein, a hand held computing device comprises an authentication module, third-party applications, clone of native applications and a security module. The authentication module is run on a hardware processor in the hand held computing device and configured to provide an authentication when a user tries to access the secret storage location. A user is enabled to access and install the third-party applications in the secret storage location after a positive authentication. The clones of native applications are created in the secret storage location to access the native applications, that are installed outside the secret storage location. A security module determines whether the privacy of a user is breached, based on a plurality of inputs and automatically shuts down the secret storage location application on detection of breach of privacy. Depending on the level of privacy breach, the application also shuts down the handheld computing device.

According to an embodiment herein, a method is provided for creating and installing secret storage for storing applications. The method comprises the following steps. The handheld computing device is started. The device is accessed by unlocking the device. An application is accessed and run to get access a secret location. An authentication process is executed for accessing the secret location. When the authentication is successfully processed, the secret location is accessed for installing an application. When the authentication is failed, the authentication process is restarted. The secret storage location is accessed for installing the new applications, accessing the previously installed applications and stored tiles. The clones are created for the applications that are installed outside the secret storage location. The privacy invasion or the unauthorized access to the secret location is continuously checked for. When the privacy invasion is detected, the secret storage area access application is shut down and an access to the secret storage location is denied the access to the secret storage area is stopped, when the user ends the application that enables the access to the secret storage area or a preset condition for closing secret storage is satisfied These and other aspects of the embodiments herein will be better appreciated and understood when considered in conjunction with the following description and the accompanying drawings. It should be understood however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1:
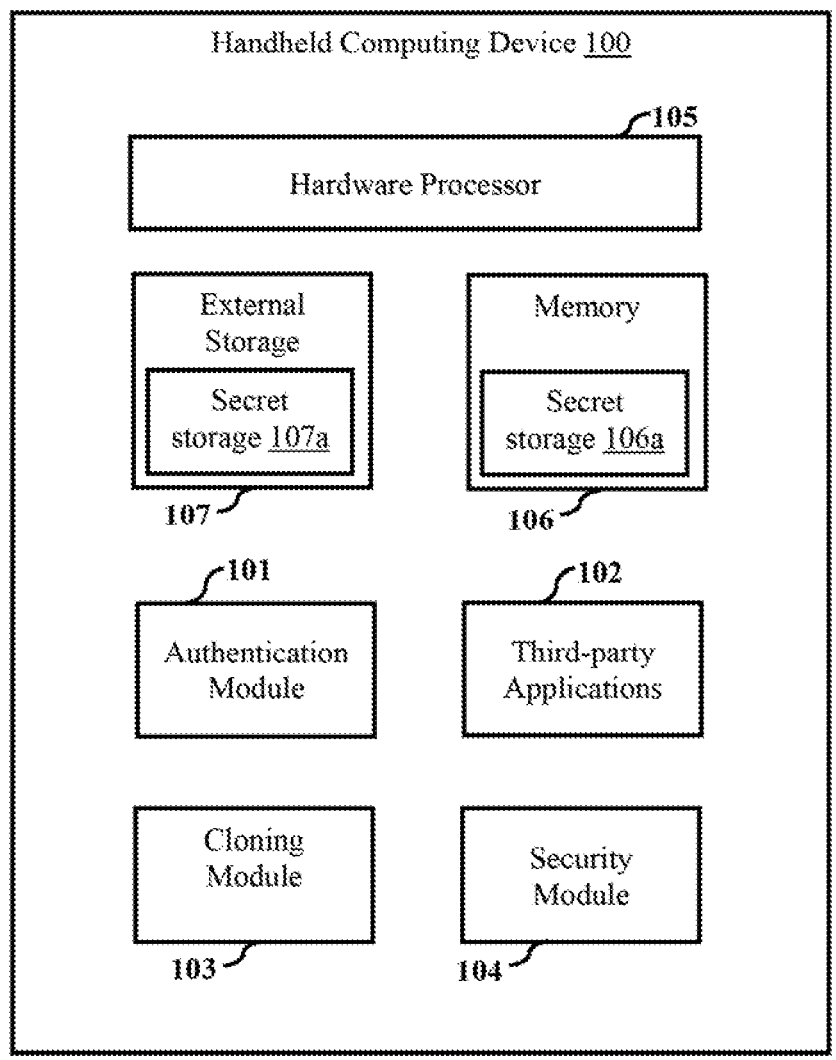
FIG. 1 illustrates a functional block diagram of a handheld computing device with secret storage application and secret storage location for storing an application, according to an embodiment herein.

Although the specific features of the embodiments herein are shown in some drawings and not in others. This is done for convenience only as each feature may be combined with any or all of the other features in accordance with the embodiment herein.

DETAILED. DESCRIPTION OF THE EMBODIMENTS HEREIN

The embodiments herein and the various features and advantageous details thereof are explained more full with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

In the following detailed description, a reference is made to the accompanying drawings that form a part hereof, and in which the specific embodiments that may be practiced is shown by way of illustration. The embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a system and method for secret and secretive installation of applications on the handheld computing devices. The embodiments herein provide an authentication-driven secret installation and access to the applications and data on the handheld computing devices. The installation and access of the secret storage is enabled either by direct installation on the computing device or through a host application on the computing device.

According to an embodiment herein, a secret digital data storage system for secretive installation of applications in a secretive location on a handheld computing device is provided. The system comprises a hardware processor, a memory module, an external memory module, a secret storage application stored on the memory module or the external memory module, an authentication module and a security module. The memory module comprises a secret storage area. The external memory module comprises a secret storage area. A secret storage application is run on the hardware processor and configured to store a data in the secret storage area in the memory module or in the secret storage area in the external memory module. The authentication module is run on the hardware processor and configured to authenticate a user to access a data stored in the secret storage area. The security module is run on the hardware processor and configured to continuously detect an intrusion of a user's privacy when the user accesses the secret storage area. The security module is run on the hardware processor and configured to shut down the secret storage application when a privacy detection is detected continuously for a preset period of time. The secret storage application is run on the hardware processor and configured to create a clone of one or more applications installed outside the secret storage area in the handheld computing device. The created clones of the plurality of applications are stored in the secret storage area.

According to an embodiment herein, the authentication module is run on the processor and configured to authenticate the user through a plurality of methods. The plurality of methods includes a bio-metric authentication process, retina authentication process, a pattern authentication process, voice authentication process, password authentication process and facial image authentication process.

According to an embodiment herein, the clones of the applications are installed in the secret storage area to enable a user to secretively access applications installed outside the secret storage area in the handheld computing device in an incognito mode.

According to an embodiment herein, the security module is run on the processor and configured to detect an intrusion of a user's privacy through an analysis of an application usage pattern and a history of usage pattern of the user.

According to an embodiment herein, the security module is run on the processor and configured to suspend an access to the secret storage area, when the intrusion of the user's privacy is detected. The security module is run on the processor and configured to communicate a unique identification code to the user through an email message, SMS message and call to mobile phone number to resume an access to the secret storage area. The user is prompted to provide the unique identification code on the handheld mobile computing device to resume an access to the secret storage area.

According to an embodiment herein, a computer implemented method comprising instructions stored on a non-transitory computer readable storage medium and executed on a hand held computing device comprising a hardware processor and memory for accessing a secret storage area provided in a device memory or in an external storage module connected to the hand held computing device, is provided. The method comprises the steps of starting the handheld computing device by powering on the handheld computing device. The handheld computing device is accessed by unlocking the handheld computing device. A secret storage area application for accessing the secret storage area is accessed. The secret storage area is accessed for installing new applications or for accessing a plurality of pre-installed applications and a plurality of stored files. An authentication detail is provided for accessing the secret storage area. An authentication process is performed through an authentication module. The user is allowed to access the secret storage area for accessing an application or data stored in the secret storage area, when the user is successfully authenticated. The secret storage area application is shut down to pre em an access to the user to the secret storage area, when the user is not successfully authenticated. A breach of privacy of the user in accessing the secret storage area is checked continuously with a security module. The security module is run on the hardware processor and configured to continuously detect an intrusion of a user's privacy when the user accesses the secret storage area. The security module is run on the hardware processor and configured to shut down the secret storage application when a privacy detection is detected continuously for a preset period of time. An access to the secret storage area is terminated, when an operation of the secret storage application is stopped by the user through the hand held computing device or when a preset condition for closing the access to secret storage area is satisfied.

According to an embodiment herein, the step of performing the authentication process comprises authenticating the user through a plurality of methods with the authentication module. The plurality of methods includes a bio-metric authentication process, a retina authentication process, a pattern authentication process, voice authentication process, a password authentication process and a facial image authentication process.

According to an embodiment herein, the step of checking for a breach of privacy of the user in accessing the secret storage area continuously with a security module comprises detecting an intrusion of a user's privacy through an analysis of an application usage pattern and a history of usage pattern of the user.

According to an embodiment herein, the method further comprises suspending an access to the secret storage area through the security module, when the intrusion of the user's privacy is detected. The security module is run on the processor and configured to communicate a unique identification code to the user through an email message. SMS message and call to mobile phone number to resume an access to the secret storage area. The user is prompted to provide the unique identification code on the handheld mobile computing device to resume an access to the secret storage area.

According to an embodiment herein, a method further comprises creating a clone of one or more applications installed outside the secret storage area in the handheld computing device. The created clones of the plurality of applications are stored in the secret storage area. The clones of the applications are installed in the secret storage area to enable a user to secretively access applications installed outside the secret storage area in the handheld computing device in an incognito mode.

According to an embodiment herein, a system and method is provided for a secret access and installation of applications on the handheld computing devices. An authentication for access and installation of applications is enabled through a plurality of ways such as text, audio, video, images based recognition, location etc., in the handheld computing device. A secret storage is enabled with options for secret secretive installation and access to a plurality of applications in a handheld computing device.

According to an embodiment herein, a method for enabling access to pre-installed applications in a handheld computing device through secret storage location, is provided. Clones of applications which are pre-installed on handheld computing device are created in the secret storage to enable an authentication-driven secret and secretive application.

According to an embodiment herein, a method is provided to detect privacy intrusion during access of secret storage. When the privacy of a user using secret and secretive usage is compromised or breached, the secret storage application detects the privacy breach and automatically shuts down the secret storage application through a plurality of sensors in the handheld computing device such as image sensors, video sensors, proximity sensors, location sensors etc. Depending on the level of privacy breach, the application is configured to shut down the handheld computing device.

According to an embodiment herein, a hand held computing device comprises an authentication module, third-party applications, clone of native applications and a security module. The authentication module is run on a hardware processor in the hand held computing device and configured to provide an authentication when a user tries to access the secret storage location. A user is enabled to access and install the third-party applications in the secret storage location after a positive authentication. The clones of native applications are created in the secret storage location to access the native applications, that are installed outside the secret storage location. A security module determines whether the privacy of a user is breached, based on a plurality of inputs and automatically shuts down the secret storage location application on detection of breach of privacy. Depending on the level of privacy breach, the application also shuts down the handheld computing device.

According to an embodiment herein, a method is provided for creating and installing secret storage far storing applications. The method comprises the following steps. The handheld computing device is started. The device is accessed by unlocking the device. An application is accessed and run to get access a secret location. An authentication process is executed for accessing the secret location. When the authentication is successfully processed, the secret location is accessed for installing an application. When the authentication is failed, the authentication process is restarted. The secret storage location is accessed for installing the new applications, accessing the previously installed applications and stored files. The clones are created for the applications that are installed outside the secret storage location. The privacy invasion or the unauthorized access to the secret location is continuously checked for. When the privacy invasion is detected, the secret storage area access application is shut down and an access to the secret storage location is denied the access to the secret storage area is stopped, when the user ends the application that enables the access to the secret storage area or a preset condition for closing secret storage is satisfied.

FIG. 1 illustrates a functional block diagram of a secretive storage system for handheld computing, devices. The hand held computing device 100 comprises an Authentication Module 101, Third-party Applications 102, Clone of Native Applications 103 and Security Module 104. The hand held computing device 100 further comprises a hardware processor 105 for executing the software applications in the Authentication Module 101, Third-party Applications 102, Clone of Native Applications 103 and Security Module 104. The Authentication Module 101 is run on the hardware processor 105 and configured to provide an authentication, when a user tries to access the secret Storage Location 107*a*. In the external storage memory 107 or the secret storage area 106*a* in the device memory 106. A user is enabled to access and install Third-party Applications 102 in the Secret Storage Location 107*a*, 106*a* after a positive authentication. For users to access native applications, which are installed outside the Secret Storage Location 107*a*, 106*a*, Clones of Native Applications 103 are created in the Secret Storage Location 107*a*, 106*a*, A Security Module 104 is run on the hardware processor 105 and configured to determine whether the privacy of a user is compromised based on a plurality of inputs and automatically shuts down the Secret Storage Location application. Depending on the level of privacy breach, the secret storage application is run on the hardware processor 105 and configured to shut down the handheld computing device. The secret storage application is downloaded and stored on the hand held computing device 100.

Figure 2:
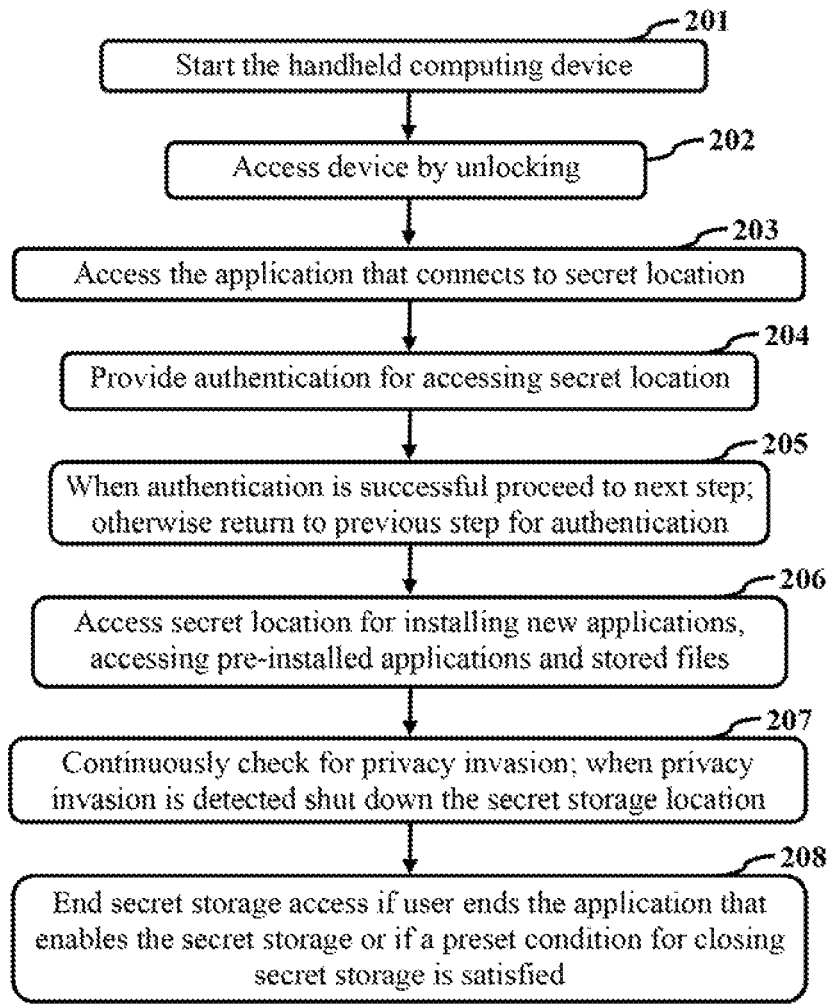
FIG. 2 illustrates a flowchart explaining a method for creating and installing secret storage location for storing an application in a hand held computing device, according to an embodiment herein.

FIG. 2 illustrates a flowchart explaining a method for creating and installing secret storage location for storing an application in a hand held computing device, according to an embodiment herein, a method is provided for creating and installing secret storage for storing applications, the method comprises the following steps. The handheld computing device is started (201). The device is accessed by unlocking the device (202). An application is accessed and mil to get access a secret location (203). An authentication process is executed fir accessing the secret location (204). When the authentication is successfully processed, the secret location is accessed for installing an application (205). When the authentication is failed, the authentication process is restarted. The secret storage location is accessed for installing the new applications, accessing the previously installed applications and stored files (206). The clones are created for the applications that are installed outside the secret storage location. The privacy invasion or the unauthorized access to the secret location is continuously checked for (207). When the privacy invasion is detected, the secret storage area access application is shut down and an access to the secret storage location is denied. The access to the secret storage area is stopped, when the user ends the application that enables the access to the secret storage area or a preset condition for closing secret storage is satisfied (208).

The advantages of the embodiments disclosed herein comprise an authentication-driven secret installation and access to applications and data on handheld computing devices. The installation and access of the secret storage is enabled either by direct installation on the computing device or through a host application on the computing device. The embodiments also comprise a security module that automatically shuts off the application if privacy of a user is compromised.

The foregoing description of the specific embodiments will so fully reveal the general nature of the embodiments herein that others can, by applying current knowledge, readily modify and or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the an will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the appended claims.

It is also to be understood that the following claims are intended to cover all of the generic and specific features of the embodiments described herein and all the statements of the scope of the embodiments which as a matter of language might be said to fall there between.

What is claimed is:

1. A computer implemented system for facilitating secretive installation and execution of predetermined software application programs on a handheld computing device accessible to a plurality of users, said system comprising:
   a processor;
   at least one memory module communicably coupled to said processor, said memory module storing therein computer executable instructions for facilitating secretive and installation execution of predetermined software application programs on said handheld computing device, said processor configured to operate upon said memory module and execute said computer executable instructions stored therein, in order to:
      create a secret storage space within said memory module and restrict said users of said handheld device from directly accessing said secret storage space;
      segregate said secret storage space into a plurality of secret storage memory locations, and assign each of said secret storage memory locations to each of said users, and render each of said secret storage memory locations accessible to respective users only after a successful authentication of corresponding unique user identities;
      configure each of said secret storage memory locations to store therein, at least third-party software application programs installed by each of said users, and further configure each of said secret storage locations to provide corresponding users with access to said third-party software application programs only in an event said corresponding unique user identities are successfully verified;
      access said memory module and identify native software applications installed by each of said users outside each of said secret storage memory locations and in respective non-secret memory locations, said native software applications operable in a normal operation mode;
      replicate each of said native software applications to create clone applications thereof;
      trigger migration of said clone applications to corresponding secret storage memory locations, and further cause each of said secret storage memory locations to store a combination of said third-party software application programs installed by each of said users and said clone applications created as replicas of said native software applications;
      enable said clone applications to be accessed from said corresponding secret storage memory locations in an incognito mode, instead of triggering access of said native software applications from respective non-secret memory locations and in said normal operations mode;
      continually monitor a current usage pattern of each of said third-party software application programs installed in each of said secret storage locations, and compare said current usage pattern with a corresponding historic usage pattern;
      based at least on a comparison between said current usage pattern and said corresponding historic usage pattern, identify variations between said current usage pattern and said corresponding historic usage pattern, and further determine, based at least on said variations, whether at least one of said third-party software application programs stored in at least one of said secret storage memory locations is accessed without successful authentication of a corresponding unique user identity;
      in an event at least one of said third-party software application programs is determined to be accessed without authorization, trigger at least a termination of third-party software application determined to be accessed without authorization, and further trigger at least a temporary suspension of access to a secret storage memory location storing said third-party software application determined to be accessed without successful authentication of a corresponding unique user identity; and
      render said secret storage memory location re-accessible only in an event a user assigned with said secret storage memory location, successfully re-authenticates himself using said corresponding unique user identity.

2. The system as claimed in claim 1, wherein the processor is further configured to trigger said user to reauthenticate his unique user identity using a combination of a One-Time Password (OTP) and a predetermined authentication method selected from the group of authentication methods consisting of a biometric user authentication process, a pattern based user authentication process, and voice based user authentication process.

3. The system as claimed in claim 2, wherein the processor is further configured to transmit said One-Time Password (OTP) to said user via at least one of an email message, SMS and a voice message directed to said handheld device.

4. A computer-implemented method for facilitating secretive installation and execution of predetermined software application programs on a handheld computing device accessible to a plurality of users, said method comprising the following computer-implemented steps:
   creating, by a processor, a secret storage space within a memory module communicably coupled to said processor, and restricting, by said processor, said users from directly accessing said secret storage space;
   segregating, by said processor, said secret storage space into a plurality of secret storage memory locations, and assigning, by said processor, each of said secret storage memory locations to each of said users, and rendering each of said secret storage memory locations accessible to respective users only after a successful authentication of corresponding unique user identities;
   configuring, by said processor, each of said secret storage memory locations to store therein, at least third-party software application programs installed by each of said users, and further configuring, by said processor, each of said secret storage locations to provide corresponding users with access to said third-party software application programs only in an event said corresponding unique user identities are successfully verified;
   accessing, by said processor, said memory module and identifying, by said processor, native software applications installed by each of said users outside each of said secret storage memory locations and in respective non-secret memory locations, said native software applications operable in a normal operation mode;
   replicating, by said processor, each of said native software applications and creating, by said processor, clone applications of said native software applications;
   triggering, by said processor, migration of said clone applications to corresponding secret storage memory locations, and further causing, by said processor, each of said secret storage memory locations to store a combination of said third-party software application programs installed by each of said users and said clone applications created as replicas of said native software applications;

enabling, by said processor, said clone applications to be accessed from said corresponding secret storage memory locations in an incognito mode, instead of triggering access of said native software applications from respective non-secret memory locations and in said normal operations mode;

continually monitoring, by said processor, a current usage pattern of each of said third-party software application programs installed in each of said secret storage locations, and comparing, by said processor, said current usage pattern with a corresponding historic usage pattern;

based at least on a comparison between said current usage pattern and said corresponding historic usage pattern, identifying, by said processor, variations between said current usage pattern and said corresponding historic usage pattern, and further determining, by said processor, based at least on said variations, whether at least one of said third-party software application programs stored in at least one of said secret storage memory locations is accessed without successful authentication of a corresponding unique user identity;

in an event at least one of said third-party software application programs is determined to be accessed without authorization, triggering, by said processor, at least a termination of third-party software application determined to be accessed without authorization, and further triggering, by said processor, at least a temporary suspension of access to a secret storage memory location storing said third-party software application determined to be accessed without successful authentication of a corresponding unique user identity; and rendering, by said processor, said secret storage memory location re-accessible only in an event a user assigned with said secret storage memory location, successfully re-authenticates himself using said corresponding unique user identity.

5. The method as claimed in claim 4, wherein the step of rendering said secret storage memory location re-accessible only in an event a user assigned with said secret storage memory location successfully re-authenticates himself using said corresponding unique user identity, further includes the step of triggering said user to reauthenticate his unique user identity using a combination of a One-Time Password (OTP) and a predetermined authentication method selected from the group of authentication methods consisting of a biometric user authentication process, a pattern based user authentication process, and voice based user authentication process.

6. The method as claimed in claim 5, wherein the method further includes the step of transmitting, said One-Time Password (OTP) to said user via at least one of an email message, SMS and a voice message directed to said handheld device.

7. A non-transitory computer readable storage medium having computer executable instructions stored thereupon, said computer executable instructions when executed by a processor, cause the processor to:

create a secret storage space within a memory module of said handheld device, and restrict said users of said handheld device from directly accessing said secret storage space;

segregate said secret storage space into a plurality of secret storage memory locations, and assign each of said secret storage memory locations to each of said users, and render each of said secret storage memory locations accessible to respective users only after a successful authentication of corresponding unique user identities;

configure each of said secret storage memory locations to store therein, at least third-party software application programs installed by each of said users, and further configure each of said secret storage locations to provide corresponding users with access to said third-party software application programs only in an event said corresponding unique user identities are successfully verified;

access said memory module and identify native software applications installed by each of said users outside each of said secret storage memory locations and in respective non-secret memory locations, said native software applications operable in a normal operation mode;

replicate each of said native software applications to create clone applications thereof;

trigger migration of said clone applications to corresponding secret storage memory locations, and further cause each of said secret storage memory locations to store a combination of said third-party software application programs installed by each of said users and said clone applications created as replicas of said native software applications;

enable said clone applications to be accessed from said corresponding secret storage memory locations in an incognito mode, instead of triggering access of said native software applications from respective non-secret memory locations and in said normal operations mode;

continually monitor a current usage pattern of each of said third-party software application programs installed in each of said secret storage locations, and compare said current usage pattern with a corresponding historic usage pattern;

based at least on a comparison between said current usage pattern and said corresponding historic usage pattern, identify variations between said current usage pattern and said corresponding historic usage pattern, and further determine, based at least on said variations, whether at least one of said third-party software application programs stored in at least one of said secret storage memory locations is accessed without successful authentication of a corresponding unique user identity;

in an event at least one of said third-party software application programs is determined to be accessed without authorization, trigger at least a termination of third-party software application determined to be accessed without authorization, and further trigger at least a temporary suspension of access to a secret storage memory location storing said third-party software application determined to be accessed without successful authentication of a corresponding unique user identity; and render said secret storage memory location re-accessible only in an event a user assigned with said secret storage memory location, successfully re-authenticates himself using said corresponding unique user identity.

8. The computer executable instructions as claimed in claim 7, wherein said computer executable instructions, when instructed by the processor, further cause the processor to:

trigger said user to reauthenticate his unique user identity using a combination of a One-Time Password (OTP) and a predetermined authentication method selected from the group of authentication methods consisting of a biometric user authentication process, a pattern based user authentication process, and voice based user authentication process; and transmit said One-Time Password (OTP) to said user via at least one of an email message, SMS and a voice message directed to said handheld device.

\* \* \* \* \*